(12) United States Patent
Bugovics et al.

(10) Patent No.: US 12,249,056 B2
(45) Date of Patent: Mar. 11, 2025

(54) VEHICLE SURFACE ANALYSIS SYSTEM

(71) Applicant: AUTO1 Group SE, Berlin (DE)

(72) Inventors: Jozsef Bugovics, Leipzig (DE); Dudasz Zsolt, Budapest (HU); Hans Schlüter, Leipzig (DE)

(73) Assignee: AUTO1 Group SE, Berlin (DE)

( * ) Notice: Subject to any disclaimer, the term of this patent is extended or adjusted under 35 U.S.C. 154(b) by 21 days.

(21) Appl. No.: 18/245,186

(22) PCT Filed: Jul. 29, 2021

(86) PCT No.: PCT/DE2021/000127
§ 371 (c)(1),
(2) Date: Mar. 14, 2023

(87) PCT Pub. No.: WO2022/053089
PCT Pub. Date: Mar. 17, 2022

(65) Prior Publication Data
US 2023/0360187 A1    Nov. 9, 2023

(30) Foreign Application Priority Data

Sep. 14, 2020  (DE) .................. 10 2020 005 611.3
Sep. 14, 2020  (DE) .................. 20 2020 003 891.1

(51) Int. Cl.
*G06T 7/00*     (2017.01)
*G06Q 10/20*    (2023.01)
(Continued)

(52) U.S. Cl.
CPC ............ *G06T 7/0002* (2013.01); *G06Q 10/20* (2013.01); *G06T 7/73* (2017.01); *H04N 23/13* (2023.01); *H04N 23/56* (2023.01); *H04N 23/90* (2023.01)

(58) Field of Classification Search
CPC ......... G06T 7/0002; G06T 7/73; G06Q 10/20; H04N 23/13; H04N 23/56; H04N 23/90;
(Continued)

(56) References Cited

U.S. PATENT DOCUMENTS 11,726,184 B2 *  8/2023  Ferreira ................ G01S 17/894
                                                    356/4.01
2003/0071194 A1 *  4/2003  Mueller .................... G06T 7/80
                                                    348/E13.016
(Continued)

FOREIGN PATENT DOCUMENTS

DE   102005058353 A1   6/2007
DE   202013002483 U1   6/2014
(Continued)

OTHER PUBLICATIONS

Buckley Simon J et al, "Terrestrial lidar and hyperspectral data fusion products for geological outcrop analysis", Computers & Geosciences, Pergamon, Amsterdam, NL,Band 54, Feb. 8, 2013 (Feb. 8, 2013), pp. 249-258, XP028525895, DOI: 10.1016/J.CAGEO.2013.01.018, ISSN:0098-3004, Summary.

*Primary Examiner* — Dramos Kalapodas
(74) *Attorney, Agent, or Firm* — Laurence A. Greenberg; Werner H. Stemer; Ralph E. Locher

(57) ABSTRACT

A vehicle surface analysis system includes a vehicle positioning unit, an optical image acquisition unit and an evaluation unit. The vehicle positioning unit includes a rotatable platform for supporting a vehicle. The image acquisition unit includes a plurality of individual image acquisition units, which operate with different wavelength work spectra and radiation energy levels to generate a number of recorded mages. The evaluation unit includes a difference value generation module, a difference value assessment module, an overall assessment module, and a generation module. The (Continued)

evaluation unit is constructed to provide a digital surface condition image of the vehicle.

3 Claims, 3 Drawing Sheets

(51) Int. Cl.
*G06T 7/73* (2017.01)
*H04N 23/13* (2023.01)
*H04N 23/56* (2023.01)
*H04N 23/90* (2023.01)

(58) Field of Classification Search
CPC ... G01N 2021/8864; G01N 2021/8887; G01N 21/8806; G01N 21/8851; G01B 11/24; G01B 11/2513

See application file for complete search history.

(56) References Cited

U.S. PATENT DOCUMENTS

| 2009/0160930 | A1* | 6/2009 | Ruppert | G06T 1/0007 |
| | | | | 348/E9.002 |
| 2012/0218437 | A1* | 8/2012 | Hermary | G06T 5/90 |
| | | | | 348/222.1 |
| 2014/0152806 | A1* | 6/2014 | Hauk | H04N 5/222 |
| | | | | 348/121 |
| 2016/0029647 | A1 | 2/2016 | Schmitzek | |
| 2021/0035169 | A1 | 2/2021 | Bugovics | |

FOREIGN PATENT DOCUMENTS

| DE | 202018001659 U1 | 7/2019 |
| DE | 102018002621 A1 | 10/2019 |

* cited by examiner

VEHICLE SURFACE ANALYSIS SYSTEM

FIELD AND BACKGROUND OF THE INVENTION

The invention relates to a vehicle analysis system for digitally recording and evaluating the surface condition of the vehicle to be recorded, in particular a painted surface, and for providing the surface condition as a digital image.

It is basically known from the state of the art to check vehicle surfaces, in particular the condition of the vehicle paint. For example, it is known to carry out thickness measurements of paint coats by means of magnetic induction methods. The disadvantage of them is that they cannot be carried out for non-magnetic vehicle areas. Furthermore, paint coat measuring devices using the eddy-current method are known from the prior art. These ones can also be used for non-magnetic subsurfaces such as aluminum. There is still the disadvantage that a measurement of non-metallic subsurfaces, such as plastic bumpers, is not possible. Furthermore, such measuring devices known from the state of the art only provide information about the paint thickness but not about other parameters that may be relevant for an assessment of the condition. Another disadvantage is that the determination is only carried out selectively and manually and is not a contact-free technology.

SUMMARY OF THE INVENTION

The task of the invention is to provide a tamper-resistant, easy-to-use solution for recording and evaluating the condition of a vehicle surface which is independent of subjective assessments and with which the different types of vehicle surfaces can be recorded with the least possible expenditure of time and personnel.

The task is solved by a vehicle surface analysis system with the features indicated in in the independent claim. Preferred further embodiments result from the dependent claims.

The vehicle surface analysis system according to the invention comprises a vehicle positioning unit, an optical image acquisition unit and an evaluation unit as its main components.

According to the invention, the vehicle positioning unit is intended to support a vehicle to be analyzed and to define its spatial position in relation to further components of the system according to the invention. For this purpose, it comprises a platform and a platform position detection unit.

The platform is designed in terms of size and load-bearing capacity in such a way that a vehicle can be placed on it. The vehicle itself is not part of the system according to the invention. Vehicles in this sense are understood to be land-based vehicles, in particular passenger cars. The platform is designed as a rotatable unit. The axis of rotation of the platform corresponds to the vertical axis of the vehicle placed on it so that the platform is arranged in a substantially horizontal manner. Thus, the platform preferably corresponds to the design of a rotary plate.

The platform position detection unit is designed such that it can be used to gather platform position data. The platform position data describe the angular position of the rotatable platform and thus indirectly the angular position of the vehicle placed on it. If the platform is rotated during a detection process, object points of the vehicle that have different coordinates in space at different angular positions can be mapped to each other. The platform position data are made available for transmission to the evaluation unit. The vehicle positioning unit and the evaluation unit are data-connected to each other for the transmission of the platform position data.

The optical image acquisition unit is designed to provide several, preferably a large number of recorded images of the surface of the vehicle, wherein first the entire surface of the vehicle is preferably captured and, second, one and the same surface sections are captured simultaneously by several image acquisitions.

For this purpose, the optical image acquisition unit has several individual image acquisition units. According to the invention, several individual image acquisition units means that there are at least two individual image acquisition units. Preferably, however, there are at least three or a higher number of individual image acquisition units.

The individual image acquisition units each comprise a light radiation source and an image camera. The light radiation source and the image camera have a wavelength work spectrum that is matched to each other. This means that the emission spectrum of the light radiation source and the acquisition spectrum of the image camera overlap at least partially. However, the wavelength work spectrum of the several individual image acquisition units differs from each other.

Preferably, the optical image acquisition unit has an image acquisition unit in the infrared wavelength range (hereinafter also abbreviated to IR), an individual image acquisition unit in the visible wavelength range and an image acquisition unit in the ultraviolet wavelength range (hereinafter also abbreviated to UV). However, further image acquisition units in other wavelength ranges may also be provided. Visible light is understood to be the wavelength range from 380 nm to nm. IR is the wavelength range above 780 nm and UV is the wavelength range below 380 nm.

The light radiation source can preferably be an LED, which advantageously has a precisely determinable and narrow-band emission spectrum. The spectrum reflected by the vehicle surface depends both on the properties of the vehicle surface and on the spectrum applied by the light radiation source. By using a precisely definable emission spectrum, a high analysis quality concerning the properties of the vehicle surface can be achieved on the basis of the reflected spectrum obtained.

The reflected spectrum is recorded as an image by the associated image camera, wherein the working spectrum of the associated image camera is adapted to the emission spectrum of the light radiation source.

According to the invention, the wavelength work spectra of the several individual image acquisition units differ from each other. This means that the light radiation sources of the respective individual image acquisition units have different emission spectra and that the image cameras also have different work spectra, wherein the work spectrum of each image camera is adapted to the correspondingly mapped light radiation source.

Due to the different wavelength work spectra, different reflected spectra are obtained from one and the same object point of the vehicle surface and are available for analysis in the corresponding image acquisitions.

According to the invention, each of the individual image acquisition units is further designed to have several different radiation energy levels of the light radiation source. Several different radiation energy levels are preferably understood to mean at least two different radiation energy levels. In this context, the invention equally covers the fact that the light radiation source is supplied with different power and thus illuminates with a different luminous flux, as well as the fact that, for example, a light radiation source has a plurality of LEDs, wherein a different number of LEDs is switched on depending on the radiation energy level to be set. Light-guiding devices are also included, for example implemented by means of lenses or apertures. The different radiation energy level applied to the respective vehicle surface area to be recorded is decisive.

Particularly preferably, the respective radiation energy level is determined by the evaluation unit. In view of this aspect of the invention, the light radiation source receives a control signal from the evaluation unit for this purpose, which can be transmitted via a separate connection or optionally also via the already existing data connection between the respective individual image acquisition unit and the evaluation unit.

All individual image acquisition units provide surface coordinates directly and spatial coordinate data of object points on the vehicle surface indirectly via the inclusion of platform position data. The spatial coordinate data of all individual image acquisition units of the optical image acquisition unit are related to one and the same spatial coordinate system. For this purpose, the individual image acquisition units are calibrated in the same spatial coordinate system. Hereinafter, this is also referred to as the uniform spatial coordinate system.

Each individual image acquisition unit has an image acquisition range. The image acquisition range covers at least sections of the surface of the vehicle. The image acquisition ranges of the individual image acquisition units overlap and form a common image acquisition range. The platform is positioned in such a way that a vehicle placed on it is located at least partially in the common image acquisition range.

The vehicle is rotated by means of the vehicle positioning unit. During this rotation, the acquisition processes are carried out sequentially so that a plurality of different angular positions of the platform and thus of the vehicle, hereinafter also referred to as acquisition angles, are recorded.

Each image acquisition represents an individual acquisition. Thus, the different individual acquisitions are carried out in relation to a specific object point first by different individual image acquisition units and thus in different wavelength work spectra, second, by one and the same individual image acquisition unit with different radiation energy levels and, third, with different acquisition angles.

This spans a three-dimensional space of wavelength work spectrum, radiation energy level and acquisition angle, in which the individual acquisitions are arranged.

Furthermore, the image acquisition unit has a positioning unit. The positioning unit establishes a fixed positional relationship between the individual image acquisition units and between the individual image acquisition units and the vehicle positioning unit. It is preferably a frame or a stand. The positioning unit may also be designed as a housing.

Preferably, markings are also arranged in the common image acquisition range to enable a calibration of the individual image acquisition units into the same uniform spatial coordinate system. Preferably, the markings are to be found on the inside of a housing.

According to the invention, each of the individual image acquisition units is further characterized in that image point data of object points of the vehicle can be acquired in an image acquisition and can be provided in such a way that they can be transmitted to the evaluation unit. The image acquisition units are designed such that the image point data obtained by means of the image acquisition have, on the one hand, coordinate data of the object points and, on the other hand, wavelength-related and radiation energy level-related light intensity data. The image point data of an object point are preferably combined as a data tuple (x, y, g) and further processed.

The coordinate data are available as two-dimensional coordinate data (x, y). They can then be mapped to the spatial coordinates of the common spatial coordinate system by the evaluation unit.

Wavelength-related light intensity data in the sense of this invention are to be understood such that the light intensity data of the recorded images of the image cameras of different individual image acquisition units are determined by the respective wavelength work spectra. Thus, the light intensity data from the different individual image acquisition units can differ for one and the same object point.

For the purposes of the present invention, light intensity data related to the radiation energy level are understood to mean that the light intensity data of the recorded images of the image cameras of the same individual image acquisition units are determined by the applied radiation energy level. However, the light intensity data from the different images recorded by the same individual image acquisition units for one and the same object point differ, as expected, with different radiation energy levels.

Surprisingly, however, it has been found that the differences caused by the radiation energy levels correlate differently depending on the differences of the radiation energy levels and depending on the differences of the wavelength work spectra, and that these different correlations enable a more accurate analysis of the surface of the vehicle.

According to the invention, the evaluation unit comprises a difference value generation module, a difference value assessment module, an overall assessment module and a generation module. Physically, the evaluation unit is preferably designed as a computer with computer programs.

The evaluation unit receives the pixel data from the optical image acquisition unit and the platform position data from the vehicle positioning unit.

The difference value generation module generates difference value data from the different light intensity data.

For this purpose, the difference value module is designed to map the light intensity data of the recorded image for an object point to the light intensity data of at least one other recorded image for the same object point by means of the associated coordinate data. Thus, for example, the data tuple (x, y, g1) of a first recorded image and the data tuple (x, y, g2) of a second recorded image are combined into a data tuple (x, y, g1, g2).

The mapping can relate in particular to such images from different individual image acquisition units, which have been captured with the same radiation energy level. In this case, the recorded images are based on different wavelength work spectra.

Furthermore, images from one and the same individual image acquisition unit, which have been captured with different radiation energy levels, can be mapped.

However, it is also possible to map image acquisitions which are based both on different wavelength work spectra and on different radiation energy levels.

Furthermore, it is possible to map image acquisitions which are based on the same wavelength work spectra and on the same radiation energy levels but on different acquisition angles.

Finally, mappings are possible in all combinations of wavelength work spectra, radiation energy levels and acquisition angles.

In addition, it is possible that a multiple mapping is made in the sense that, for example in a first mapping, a first image acquisition is mapped to a further image acquisition from the same individual image acquisition unit but with a different radiation energy level, and that in a second mapping the same first image acquisition is then mapped to a further image acquisition from a different individual image acquisition unit.

Furthermore, after the completed mapping, the difference value generation module is designed to compare the light intensity data in a light intensity data comparison and to generate difference value data from this comparison, as well as to provide the difference value data for the difference value assessment module. Difference value data can thus be provided from each mapping.

Especially in the case of multiple mappings, a large number of difference value data can be provided.

The difference value assessment module is designed to perform an assessment of the data quality of the difference value data. On the basis of the assessment, these difference value data are categorized using an adjustable quality value. If the difference value data reach the adjustable quality value of the data quality, they will be categorized as usable difference value data. If the difference value data fall below the quality value, they will be categorized as non-usable difference value data. The adjustable quality value can be defined, for example, on the basis of permissible deviations of difference values from adjacent object points.

The generation of difference values and the assessment of difference values are carried out in relation to each object point used and for each image acquisition of the different individual image acquisition units.

The difference value generation module and the difference value assessment module perform a plurality of difference value assessments. It is possible that the difference value generation module and the difference value assessment module each have a multiple design. It is possible for the difference value generation module elements and the difference value assessment module elements to process the image point data from the image acquisitions in parallel, and it is also possible that a sequential processing is carried out by one and the same module or module element with subsequent temporary storage.

In particular, when image acquisitions with different radiation energy levels from one and the same individual image acquisition unit are mapped, it is advantageously possible to map one such difference value generation module element or one difference value assessment module element to one individual image acquisition unit.

The usable difference value data from the aforementioned acquisition for the specific object point, the difference value generation and the subsequent difference value assessment are transmitted to the overall assessment module and form the basis for an overall assessment from all usable difference value data for this object point.

The overall assessment module uses the coordinate data for the object points to map the usable difference value data from the difference value assessment module and thus from the individual image acquisition units to one another.

The overall assessment module is designed in such a manner that a comparison of the quality value of the usable difference value data of a difference value generation with the quality value of the usable difference value data of a further difference value generation can be carried out. On this basis, an object point-related weighting, for example I form of a ranking categorization, of the usable difference value data of the difference value generations can be carried out as a function of the quality value. For example, it is possible to map a weighting factor to the difference value data according to the rank categorization. For example, the difference value data for a certain object point with the highest quality value receive the highest weighting factor. Difference value data for this particular object point with a lower quality value receive only a low weighting factor. The weighting factor can be used for subsequent processing and, in particular, can be involved in the determination of how the different weighted difference value data are related to one and the same object point. The weighted difference value data are provided to the generation module in a transferable form.

Thus, the weighting is based on an evaluation of the quality of the difference value data by means of the quality value. The evaluation of the quality can be absolute or relative to the recorded data quality of the difference value data. In addition to discrete algorithms, it is also possible to use algorithms that include an "n-to-n" relationship in the quality evaluation. In this way, it is possible, for example, to increase the resulting quality of the analysis in the case of a low quality of the difference value data from a difference value generation based on individual acquisitions from one acquisition angle by using the difference value data from difference value generations based on individual acquisitions from several acquisition angles or in the case of a low quality of the difference value data from a difference value generation based on individual acquisitions with one radiation energy level by using the difference value data from difference value generations with several different radiation energy levels, always related to one and the same object point.

Furthermore, a plausibility check can be carried out by the overall assessment module. If at least three weighted difference value data are available for one and the same object point, the overall assessment module can carry out a comparison of the weighted difference value data available for a specific object point and may be designed in such a manner that, from an adjustable degree of deviation of the first weighted difference value data from the second and third weighted difference value data, the first weighted difference value data are discarded and are not provided for further transfer to the generation module.

The generation module is designed such that it maps the coordinate data from the weighted difference value data of the individual image acquisition units to a uniform spatial coordinate system, taking into account the platform position data. For different angular positions of the platform, different coordinate data of the weighted difference value data of one and the same object point of the vehicle are provided. Nevertheless, an unambiguous mapping of all weighted difference value data relating to one and the same object point can be made to this object point, because the platform coordinate data are also known to the evaluation unit.

On this basis, a digital surface contour image of the vehicle is generated in the uniform spatial coordinate system first.

Initially, the digital surface contour image thus generated is based only on the coordinate data.

Then, the generation module supplements the digital surface contour image of the vehicle by adding the further data from the weighted difference value data on the basis of the coordinate data, thus creating a digital surface condition image of the vehicle. The further weighted difference data are the data from the data tuples that are not coordinate data, i.e., in particular data related to the differences of the light intensity values, data related to the weighting, data related to wavelengths and radiation energy levels, and so on.

The digital surface condition image is provided in a displayable form.

As a particular advantage, the digital surface condition image provides comprehensive information on the overall condition, on damages and previous touch-ups and repairs of the vehicle surface.

In particular, it provides information on the following properties of the surface of the vehicle:
- determination of the relative age of the paint of a painted surface
- determination of the thickness of a clear coat finish
- visualization of defects and irregularities of a painted surface
- detection of scratches or damages on a painted surface and in underlying layers
- determination of the UV transmittance of glass surfaces
- assessment of the ageing condition of plastic surfaces
- detection of breaks and cracks of plastic surfaces
- detection of color differences in painted surfaces
- determination of the gloss level and the smoothness and surface quality of painted surfaces.

A further advantage is given by the contactless determination of the properties under conditions in which all possibly disturbing or falsifying influences can be excluded.

As a particular advantage, the vehicle surface analysis system enables the generation of a uniform digital surface condition image of a vehicle on the basis of several different individual image acquisition units.

For one and the same object point, image point data are provided from individual acquisitions carried out by different individual image acquisition units.

Although the expert tends to increase the informative value of an analysis result by cumulating a large database, it has been surprisingly found that, on the contrary, an improvement in the quality of the analysis result can be achieved by the determination of difference values from the collected database and thus by the initial reduction of the database.

Furthermore, the following facts are particularly advantageous:

First, the individual image acquisition units can advantageously support each other. For example, image acquisitions in a certain wavelength range can provide a high information quality for certain sections of the vehicle surface, but not for other sections, whereas, conversely, image acquisitions in a different wavelength range provide a particularly high information quality just for these other sections.

Second, it is advantageous that the vehicle surface analysis system automatically identifies the quality and thus the suitability for use of the pixel data from different image acquisitions and always uses the pixel data that provide a higher quality of the digital surface condition image.

Third, the pixel data are advantageously first allocated in the way of subtractive mapping by the generation of difference values. Subsequently, a cumulative mapping of the difference values is carried out to further improve the quality of the analysis result.

As a further advantage, the digital surface condition image additionally allows to display the vehicle in different views, e.g., with closed or open doors, as well as in different perspectives, e.g., in a 360° view.

A particular advantage is that the result achieved is a digital image of the vehicle which has a sufficient database, in particular for the following two important applications.

First, the digital surface condition image is suitable for recording vehicle damages and automatically determining the necessary repair measures from this, specifying the required spare parts and necessary work steps as well as the repair costs derived from this, wherein everything can be realized in digital form. It is particularly advantageous here that damages caused by overpainting can be detected and displayed.

Second, a vehicle appraisal can be carried out automatically by further processing the digital image, for example to support the remote sale of used vehicles. In the vehicle appraisal, additional data such as vehicle age, mileage, number of previous owners and other value-determining factors can be included in the automated calculation of the vehicle value.

The security against manipulation and the reliable documentation of a vehicle damage registration or a vehicle appraisal are of particular advantage.

Another advantage is the modularity of the vehicle surface recording system. Depending on the requirements, i.e., depending on the quality specifications or on the types of vehicle surfaces to be analyzed, such as painted surfaces, glass surfaces or plastic part surfaces, the vehicle surface analysis system can be equipped with different individual image acquisition units, or only specific image acquisition units can be used for the image acquisition.

The vehicle surface analysis system according to the invention is based in particular on the fact that all individual image acquisition units and thus all image acquisitions are calibrated to one and the same coordinate system. The image point data are acquired several times due to the different design of the image acquisition units and also due to the fact that the acquisition can be carried out in different angular positions as a result of the rotation of the vehicle on the platform. The quality of the acquired pixel data is increased because even uncertain information from a single acquisition can be used by adding other uncertain information from one or more further individual acquisitions.

The digital surface condition image can advantageously be represented as several layers, which is the reason that it can also be referred to as a multi-layer information. Each layer contains information of different kind, for example in one layer information on surface damages and in another layer information on hidden repairs of previous damages. In this way, the viewer or, for example, a vehicle assessor obtains more information than from a mere pictorial representation of the surface of the vehicle.

The result of the recording of the vehicle surface is provided as a digital surface condition image with several types of information so that the digital surface condition image is designed to represent a digital twin of the surface of the recorded vehicle.

The digital surface quality image as a digital twin makes it also possible that the information aggregated in it can be further processed automatically, for example for a repair calculation.

According to an advantageous further development, the vehicle surface analysis system comprises a housing and the vehicle positioning unit is arranged inside the housing. The housing has the particularly advantageous effect that defined light conditions can be achieved in both the visible and non-visible spectrum during the recording processes and, in particular, sources of interfering light are screened off. Therefore, the accuracy of the recorded object data can be advantageously increased. Simultaneously, the environment and in particular the personnel are protected from light sources of the individual image acquisition units, which is particularly relevant for UV light radiation sources with a higher radiation energy level. Preferably, the housing can, at the same time, completely or partially form the positioning unit of the optical image acquisition unit and determine the positional relationship of the individual image acquisition units. For this purpose, the optical image acquisition unit is preferably also arranged within the housing.

According to another further development, the vehicle recording system comprises a comparison module. The comparison module includes a database with data on a normative digital image. The database can be an internal database or an external database. An external database enables central data administration as an additional advantage. The normative digital image describes a vehicle of the same type in the as-fabricated condition.

The comparison module is designed to perform a comparison between the digital surface condition image and the normative surface condition image and to generate a digital difference image. The digital difference image describes the extent to which the condition of the vehicle, the vehicle condition of which is recorded, deviates from the as-fabricated condition of the vehicle surface. Thus, the digital difference image shows particularly the degree of ageing, damages and repairs to the surface, i.e., in particular paint touch-ups and overpainting of damages beneath the surface. Therefore, an output can be made, for example, in the form of a condition report. This vehicle condition report can also be a basis for statements on necessary repairs, in particular paint repairs, or on the value of the vehicle in question.

A further development provides that the vehicle recording system comprises a repair calculation module. The repair calculation module comprises a database with repair data, wherein the repair data include data on repair work times and repair costs, as well as possibly also on spare parts such as plastic parts of the vehicle surface. This database can also exist as an internal database or an external database.

Data on spare parts indicate which spare parts are required for a repair in the event of which damage. Data on repair work times contain the repair times, usually referred to as labor values, required to carry out a repair. Data on repair costs indicate the prices at which spare parts are available and the costs at which repair work is available. Therefore, the repair costs are preferably stored as standard prices in the database.

The repair calculation module is designed to create a repair assessment on the basis of the digital difference image and the repair data, wherein the repair assessment includes spare parts required for a repair, repair work times to be spent and repair costs.

By means of this further development, it is advantageously possible to obtain automated and tamper-proof statements on necessary repairs and their costs. Thus, estimates of costs can be generated automatically. As an advantage, considerable personnel costs can be saved in this way.

In an advantageous further development, it is also possible to automatically place spare parts orders on the basis of the repair assessment.

According to a further development, the vehicle recording system comprises a valuation module. The valuation module includes a database with vehicle price data. Again, this database can be an internal database or an external database.

Vehicle price data are understood to be, for example, list prices depending on the vehicle configuration, price tables depending on vehicle age, mileage, number of previous owners and any additional price data.

The valuation module is designed to generate a valuation based on the vehicle price data of the digital surface condition image, the digital difference image and the repair data. This valuation can preferably be a depreciation-in-value or an appreciation-in-value amount based on the surface condition, which expresses the extent to which the surface condition of the vehicle is above or below the average of comparable vehicles considering the age of the vehicle.

According to this further development, a solution is advantageously available that supports the determination of a commercial value of a vehicle, is automated and thus requires only little work, is tamper-proof and can be reliably documented.

By using an exemplary embodiment, the invention is explained in more detail on the basis of the attached drawings.

DETAILED DESCRIPTION OF THE INVENTION

Figure 1:
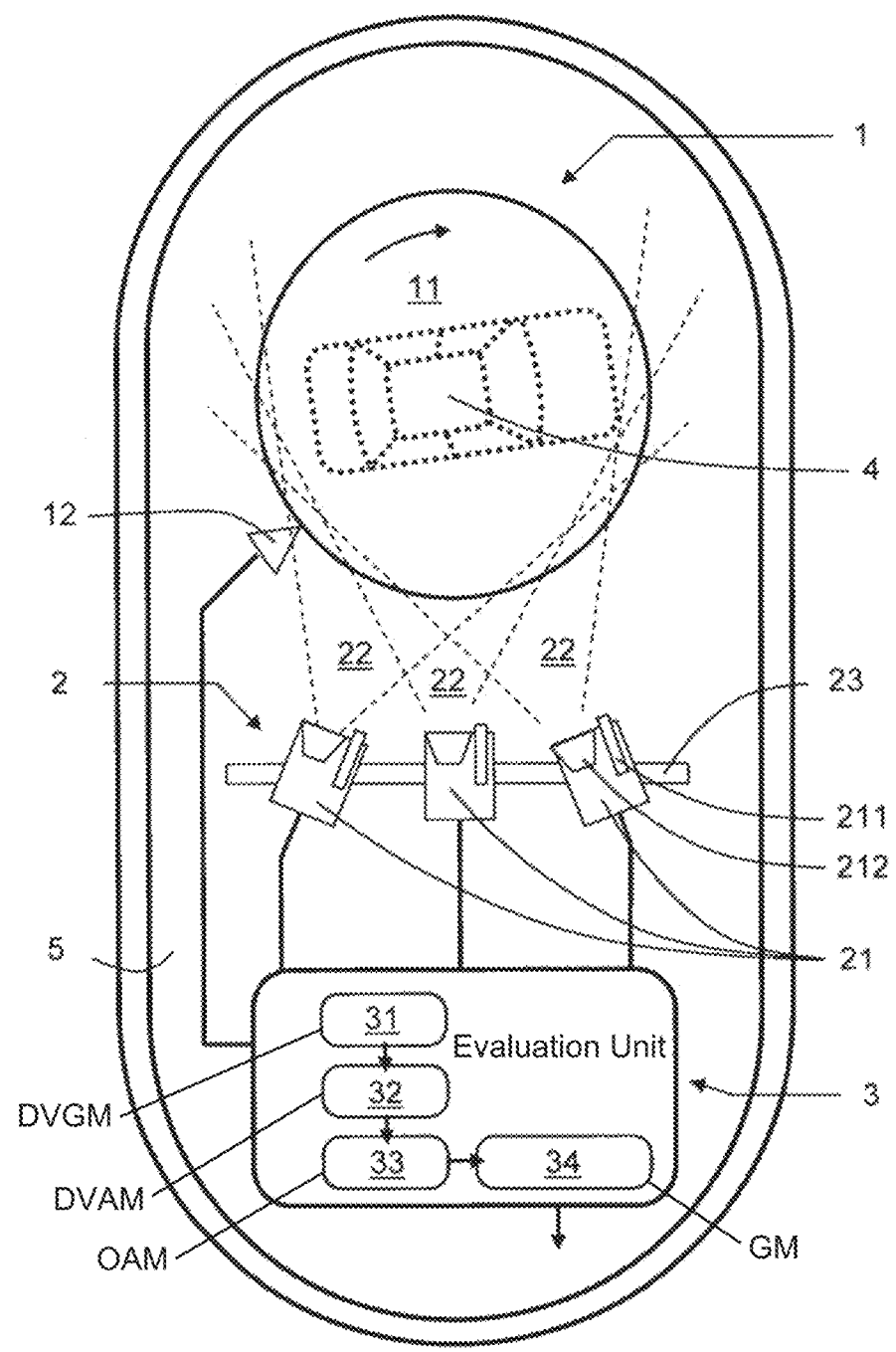
FIG. 1 Schematic representation in top view

FIG. 1 shows a schematic representation of a first embodiment of the vehicle surface analysis system.

The vehicle 4 can be fixed in its positional relationship relative to the optical image acquisition unit 2 by means of a vehicle positioning unit. For this purpose, the vehicle positioning unit 1 comprises a rotatable platform 11. The vehicle 4 can be driven onto this platform as intended. The arrow illustrates the rotatability of the platform 11. A further element of the vehicle positioning unit 1 is the platform position detection unit 12. It records the rotational position and thus the angular position of the platform 11 and transmits it to the evaluation unit 3 via a wired data connection.

FIG. 1 also shows the optical image acquisition unit 2. It comprises three individual image acquisition units 21 (IIAU) in the exemplary embodiment. Each of the individual image acquisition units has a light radiation source 211 and an image camera 212.

In the embodiment, a first one of the three individual image acquisition units 21 has an infrared light radiation source and an infrared image camera, a second one of the three individual image acquisition units 21 has a light radiation source and an image camera each in the visible light wavelength range, and a third one of the three individual image acquisition units 21 has a light radiation source and a camera each in the ultraviolet wavelength range.

The image acquisition range 22 of each individual image acquisition unit 21 is oriented such that it covers the vehicle 4 positioned on the platform 11. In the embodiment, the image acquisition ranges 22 overlap.

In the exemplary embodiment, the positioning unit 23 is designed as a frame. The individual image acquisition units 21 are rigidly mounted on it and are thus fixed in their positional relationship to each other and to the platform 11. This design makes it possible to map all image point data captured by the individual image acquisition units 21 to object points of the vehicle to a uniform spatial coordinate system after calibration has been performed.

In the exemplary embodiment according to FIG. 1, the vehicle surface analysis system has a housing 5 which is opaque to the wavelength ranges of all three individual image acquisition units. In particular, the vehicle positioning unit 1 and the optical image acquisition unit 2 are arranged in the interior of the housing 5. The housing 5 is provided with a closable opening (not shown in FIG. 1) through which the vehicle 4 can be moved into the interior onto the platform 11 and out again after completed recording.

FIG. 1 also shows the evaluation unit 3, which in this example is a computer system consisting of a computer with a software.

The evaluation unit 3 is connected via data connections to the three individual image acquisition units 21 and from where it receives the image point data of the object points of the vehicle surface of the vehicle 4 from image acquisitions, also called individual acquisitions. (The data connections to the evaluation unit 3 from the individual image acquisition units 21 and from the platform position detection unit 12 are shown without reference numerals).

According to FIG. 1, the evaluation unit 3 has a difference value generation module 31 (DVGM), a difference value assessment module 32 (DVAM), an overall assessment module 33 (OAM) and a generation module 34 (GM).

The difference value generation module 31 is used to map the individual image acquisitions. In the present exemplary embodiment, several image acquisitions are available from each individual image acquisition unit 21, each of which has been recorded with different radiation energy levels. According to the first exemplary embodiment, the difference value generation module 31 is designed in such a manner that a mapping of the image acquisitions of the different individual image acquisition units 21, i.e., with different wavelength work spectra but the same radiation energy level in each case, is performed and that the difference of the light intensity values is determined from each mapping and provided as a difference value.

The difference value assessment module 32 receives the difference values from the difference value generation module 31 and is configured such that it performs an assessment of the data quality of the difference values. Each of the received difference values is assessed on the basis of a comparison with difference values to adjacent object points as to whether it is a plausible difference value. A difference value that fulfills this criterion is categorized as usable in the present embodiment and forwarded as a usable difference value to the overall assessment module 33. Otherwise, the difference value is categorized as non-usable and thus discarded and not forwarded. All received difference values are successively processed in this manner by the difference value assessment module 32.

Thus, the difference value assessment module 32 provides the feature that only sufficiently reliable data are included in the surface condition image of the vehicle to be created later, so that the surface condition image has a high degree of reliability, too.

In the overall assessment module 33, the usable difference value data obtained from the difference value assessment module 32 are mapped to each other on the basis of the coordinate data for the object points and are evaluated in relation to each other.

The mapping of the usable difference value data as belonging to the same object point is based on the fact that the evaluation unit 3 is capable to make a mapping to a uniform spatial coordinate system for all individual image acquisition units 21 due to the defined position of the individual image acquisition units 21 based on their position fixation by the positioning unit 23 and due to the angular position of the platform 11 and thus of the supported vehicle 4 known through the platform position detection unit 12.

Upon the completion of the mapping, the overall assessment module 33 compares the quality value of the usable difference value data in this exemplary embodiment. As a result of the comparison, the compared usable difference value data are ordered, for example, according to the rank of the quality value and a weighting factor is mapped to them. The usable difference value data with the highest quality value receive the highest weighting factor and vice versa. The weighting factor corresponds to the quality value. The usable difference value data for each recorded object point are provided together with the weighting factor to the generation module 34.

By including the platform position data, the generation module 34 maps the coordinate data from the usable difference value data to the uniform spatial coordinate system.

Based on the coordinate data, a digital surface contour image of the vehicle 4 is first generated in the uniform spatial coordinate system. The digital surface contour image is formed by a point cloud corresponding to the geometry of the vehicle surface.

Subsequently, the further data from the weighted difference data are added on the basis of the coordinate data to the digital surface contour image of the vehicle 4, and thus a digital surface condition image of the vehicle 4 is generated.

This digital surface condition image is then provided in a displayable form. In the exemplary embodiment, the digital image is transmitted as a file. The digital surface condition image can also be visualized in a monitor functioning as a data output device. However, the digital surface condition image goes beyond mere visualization. In particular, in the exemplary embodiment it is possible to adjust the visualization according to certain analysis criteria, such as paint thickness, paint age or covered corrosion spots. Depending on the analysis criterium, the visualization can be set in such a way that it deviates from the visual impression and highlights the gradual formation of the analysis criteria in color.

Figure 2:
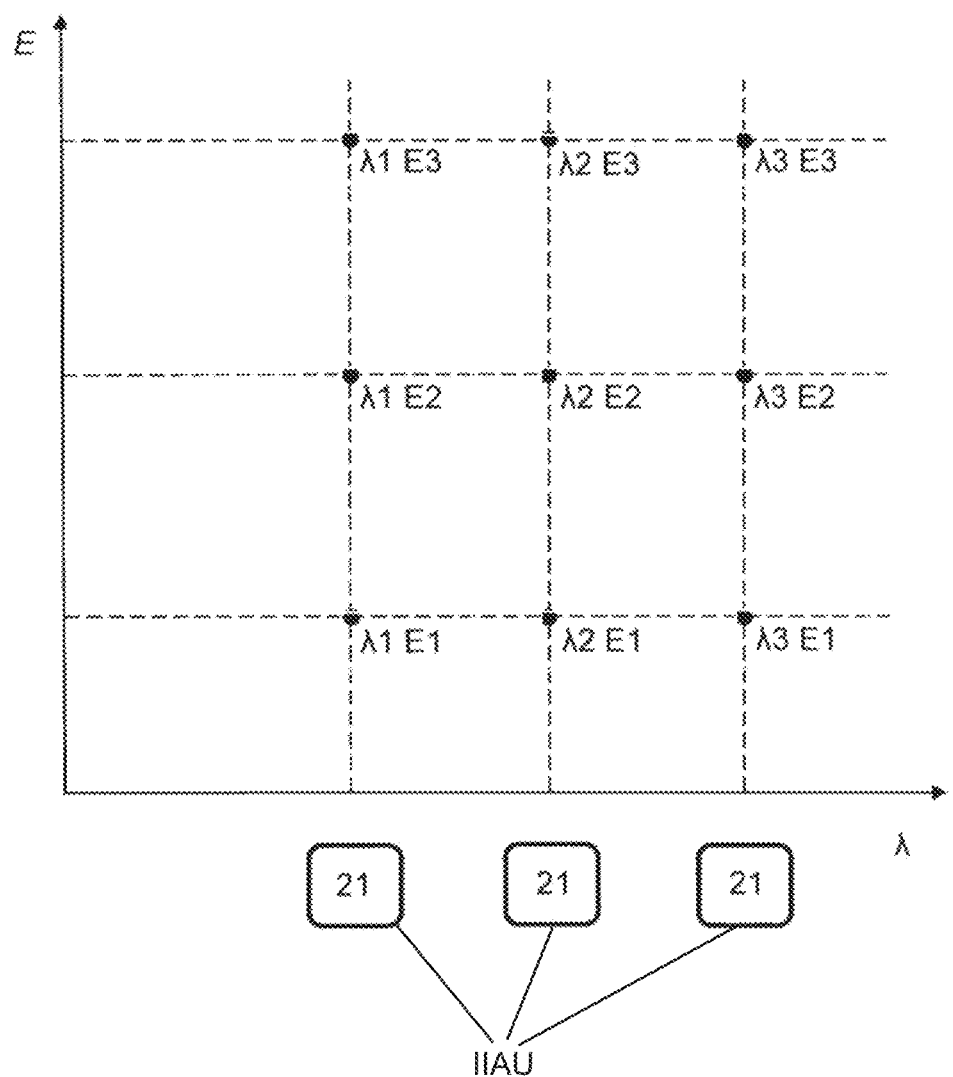
FIG. 2 Schematic representation of image acquisitions from acquisition processes FIG. 3 Block diagram with repair calculation module and valuation module.

FIG. 2 shows a possible classification of image acquisitions from acquisition processes in an exemplary embodiment. The x-coordinate represents the wavelength $\lambda$ and the y-coordinate the radiation energy level E. In this embodiment, the image acquisitions are made by three individual image acquisition units 21, wherein the first individual image acquisition unit 21 operates in the wavelength work spectrum $\lambda 1$ in the UV range, the second individual image acquisition unit 21 operates in the wavelength work spectrum $\lambda 2$ in the visible light range, and the third image individual image acquisition unit 21 operates in the wavelength work spectrum $\lambda 3$ in the IR range. Each of the image acquisition units generates three images with different radiation energy levels E1, E2 and E3.

The image acquisitions $\lambda 1E1$ to $\lambda 3E3$ are transmitted to the evaluation unit. In the exemplary embodiment, a mapping is first made within one wavelength work spectrum and, for example, a difference value is generated by the difference value generation module from the image acquisitions $\lambda 1E1$ and $\lambda 1E2$ as well as a further difference value is generated from the image acquisitions $\lambda 1E2$ and $\lambda 1E3$. In the same way, difference values are correspondingly generated from the image acquisitions $\lambda 2E1$ and $\lambda 2E2$ as well as from $\lambda 2E2$ and $\lambda 2E3$, and so on. Furthermore, additional difference values are generated between the image acquisitions with different wavelength work spectra but with the same radiation energy levels, for example, from the image acquisitions $\lambda 1E1$ and $\lambda 2E1$, and so on. However, difference values from arbitrary "n-to-n" mappings, such as $\lambda 1E2$ and $\lambda 3E3$, are also possible.

Figure 3:
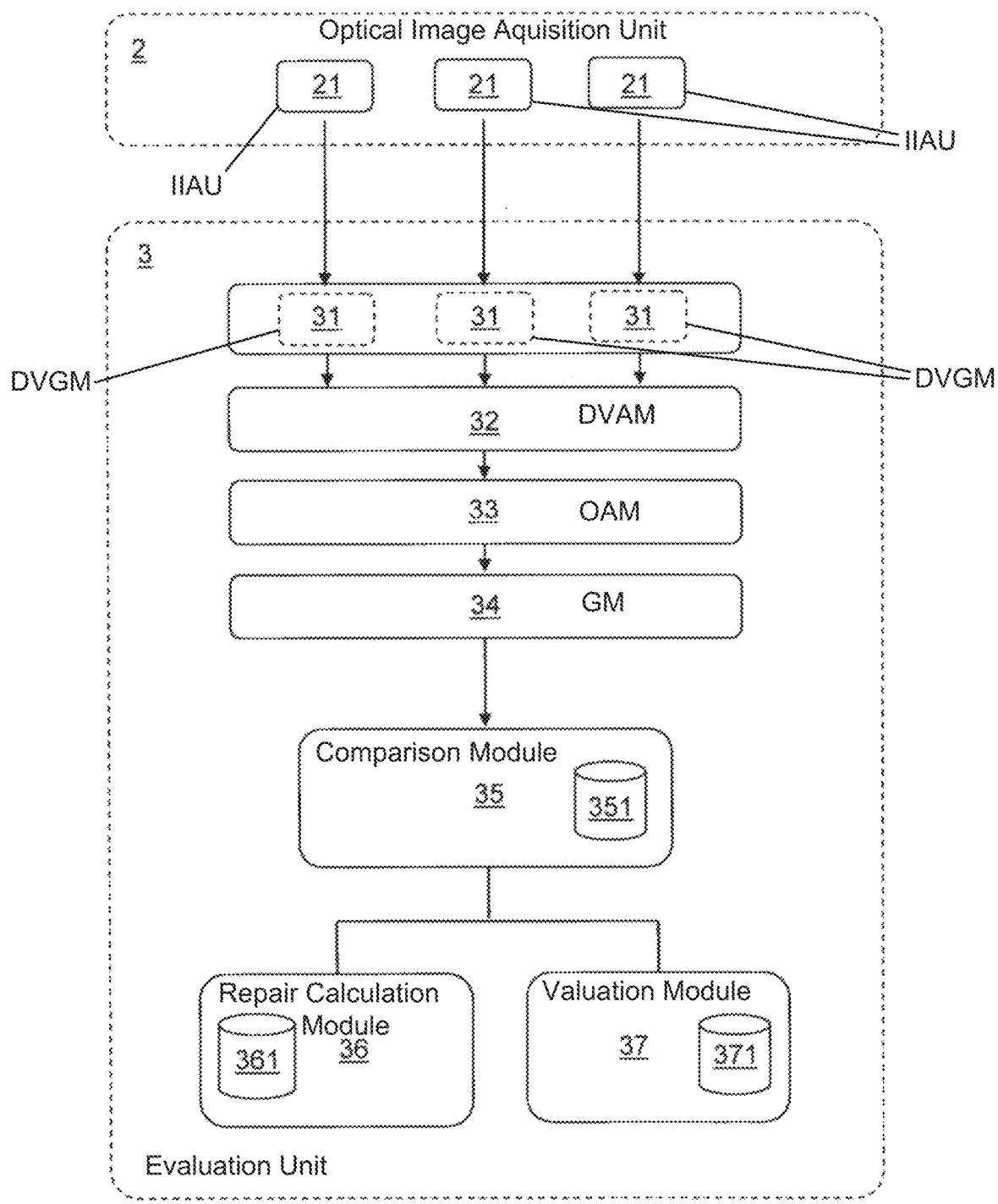

FIG. 3 shows a further exemplary embodiment in a representation as a block diagram, wherein here both a repair assessment and a valuation can be carried out additionally.

The explanations for the exemplary embodiment according to FIG. 1 and FIG. 2 apply correspondingly to the individual image acquisition units 21 of the optical image acquisition unit 2, to the difference value generation module 31, to the difference value assessment module 32, to the overall assessment module 33 and to the generation module 34.

After the digital surface condition image has been generated by the generation module 34, it is transferred to a comparison module 35 in the exemplary embodiment according to FIG. 3. The comparison module 35 contains a database 351 as a databank with data on normative digital surface condition images of many vehicle models in different designs, wherein the normative surface condition image of the recorded vehicle 4 is also included. This databank is regularly updated with new vehicle models newly launched on the market. The comparison module 35 identifies the vehicle model of the recorded vehicle 4 on the basis of the digital surface condition image and compares the digital surface condition image of the recorded vehicle 4, that it has received from the generation module 34, and the normative surface condition image of the corresponding model, that it has taken from the database 351, and generates a digital difference image. The digital difference image contains information about deviations of the recorded vehicle 4 from an originally manufactured vehicle, so that in particular hidden damages can be detected.

The digital difference image is made available to both the repair calculation module 36 and, in parallel, the valuation module 37.

The repair calculation module 36 comprises a database 361 with repair data. The repair data are model-related data on spare parts, repair work times and repair costs, wherein the repair costs are stored as standard prices. On the basis of the digital reference image and the repair data, the repair calculation module determines which spare parts are required for a repair and which repair work times have to be spent, as well as which repair costs are incurred in accordance with the stored standard prices, and outputs this as a repair assessment.

Cumulatively or alternatively, the commercial value of the recorded vehicle 4 can be determined by means of the valuation determination module 37.

For this purpose, the valuation module 37 comprises a database 371 with vehicle price data. The vehicle price data contain, in particular, data on list prices as well as age- and mileage-dependent market prices of many vehicle models, wherein data on the model of the recorded vehicle 4 are also included. On the basis of the vehicle price data, the digital difference image and the repair data, the valuation module 37 generates a vehicle valuation. Optionally, supplementary vehicle data, such as the number of previous owners, can also be manually entered via the digital image and the digital difference image and taken into account by the valuation module 37 when generating the vehicle valuation.

LIST OF REFERENCE NUMERALS 1 vehicle positioning unit
11 platform
12 platform position detection unit
2 optical image acquisition unit
21 individual image acquisition unit
211 light radiation source
212 image camera
22 image acquisition range
23 positioning unit
3 evaluation unit
31 difference value generation module
32 difference value assessment module
33 overall assessment module
34 generation module
35 comparison module
351 database of the comparison module
36 repair calculation module
361 database of the repair calculation module
37 valuation module
371 data base of the valuation module
4 vehicle
5 housing

The invention claimed is:

1. A vehicle surface analysis system, comprising:
a vehicle positioning unit;
an evaluation unit;
said vehicle positioning unit including a platform and a platform position detection unit, said platform being constructed for supporting a vehicle thereon, said platform being rotatable about a vertical axis of the placed vehicle, and said platform position detection unit being constructed for recording platform position data and providing the platform position data to the evaluation unit;
an optical image acquisition unit having individual image acquisition units and a positioning unit determining a positional relationship of said individual optical image acquisition units with respect to each other and with respect to said vehicle positioning unit, each of said individual image acquisition units having a respective light radiation source being constructed for providing a plurality of different radiation energy levels and a respective image camera, each of said individual image acquisition units having a respective image acquisition range covering a surface of the vehicle at least in sections, each of said individual image acquisition units having a respective wavelength work spectrum different from a wavelength work spectrum of another of said individual image acquisition units;
said individual image acquisition units being constructed for acquiring pixel data of an image acquisition of object points of the vehicle and for providing the pixel data to the evaluation unit, the pixel data containing wavelength-related and radiation energy level-related light intensity value data and coordinate data of the object points;
said evaluation unit including a difference value generation module, a difference value assessment module, an overall assessment module and a generation module;
said difference value generation module being configured for mapping the light intensity value data of the image acquisition for an object point by the associated coordinate data to the light intensity value data of at least one further image acquisition for a same object point, said difference value generation module being configured comparing the light intensity value data in a light intensity value data comparison and for generating difference value data therefrom and providing the difference value data to the difference value assessment module;
said difference value assessment module being configured for carrying out an evaluation of a quality of the difference value data and, on the basis of the evaluation, for carrying out a categorization in usable difference value data when an adjustable quality value of the difference value quality is reached and in non-usable difference value data when the quality value is not reached, and for providing usable difference value data to the overall assessment module;

said overall assessment module being configured for using the coordinate data for the object points for mapping the usable difference value data from the light intensity value data comparison to further usable difference value data from a further light intensity value data comparison for performing a comparison of the quality value of the usable difference value data from the light intensity value data comparison with the quality value of the further usable difference value data from the further light intensity value data comparison, and for performing a weighting of the usable difference value data, depending on the quality value, as weighted difference value data;

said generation module being configured for mapping the coordinate data from the pixel data to a uniform spatial coordinate system by including the platform position data for generating a digital surface contour image of the vehicle in the uniform spatial coordinate system for supplementing the digital surface contour image of the vehicle by adding the weighted difference value data on the basis of the coordinate data for creating a digital surface quality image of the vehicle, said generation module being configured for providing the digital surface quality image in a displayable manner;

a comparison module including a database with data on a normative digital surface condition image, said comparison module being configured for carrying out a comparison between the digital surface condition image and the normative surface condition image and for generating a digital difference image;

a repair calculation module having a database with repair data, the repair data including data on spare parts, repair work times and repair costs, said repair calculation module being configured for generating a repair assessment on the basis of the digital difference image and the repair data, the repair assessment including spare parts required for a repair, repair work times to be spent and repair costs.

2. The vehicle surface analysis system according to claim 1, further comprising:
a housing, said vehicle positioning unit being arranged within the housing.

3. A vehicle surface analysis system, comprising:
a vehicle positioning unit;
an evaluation unit;
said vehicle positioning unit including a platform and a platform position detection unit, said platform being constructed for supporting a vehicle thereon, said platform being rotatable about a vertical axis of the placed vehicle, and said platform position detection unit being constructed for recording platform position data and providing the platform position data to the evaluation unit;

an optical image acquisition unit having individual image acquisition units and a positioning unit determining a positional relationship of said individual optical image acquisition units with respect to each other and with respect to said vehicle positioning unit, each of said individual image acquisition units having a respective light radiation source being constructed for providing a plurality of different radiation energy levels and a respective image camera, each of said individual image acquisition units having a respective image acquisition range covering a surface of the vehicle at least in sections, each of said individual image acquisition units having a respective wavelength work spectrum different from a wavelength work spectrum of another of said individual image acquisition units;

said individual image acquisition units being constructed for acquiring pixel data of an image acquisition of object points of the vehicle and for providing the pixel data to the evaluation unit, the pixel data containing wavelength-related and radiation energy level-related light intensity value data and coordinate data of the object points;

said evaluation unit including a difference value generation module, a difference value assessment module, an overall assessment module and a generation module;

said difference value generation module being configured for mapping the light intensity value data of the image acquisition for an object point by the associated coordinate data to the light intensity value data of at least one further image acquisition for a same object point, said difference value generation module being configured comparing the light intensity value data in a light intensity value data comparison and for generating difference value data therefrom and providing the difference value data to the difference value assessment module;

said difference value assessment module being configured for carrying out an evaluation of a quality of the difference value data and, on the basis of the evaluation, for carrying out a categorization in usable difference value data when an adjustable quality value of the difference value quality is reached and in non-usable difference value data when the quality value is not reached, and for providing usable difference value data to the overall assessment module;

said overall assessment module being configured for using the coordinate data for the object points for mapping the usable difference value data from the light intensity value data comparison to further usable difference value data from a further light intensity value data comparison for performing a comparison of the quality value of the usable difference value data from the light intensity value data comparison with the quality value of the further usable difference value data from the further light intensity value data comparison, and for performing a weighting of the usable difference value data, depending on the quality value, as weighted difference value data;

said generation module being configured for mapping the coordinate data from the pixel data to a uniform spatial coordinate system by including the platform position data for generating a digital surface contour image of the vehicle in the uniform spatial coordinate system for supplementing the digital surface contour image of the vehicle by adding the weighted difference value data on the basis of the coordinate data for creating a digital surface quality image of the vehicle, said generation module being configured for providing the digital surface quality image in a displayable manner;

a comparison module including a database with data on a normative digital surface condition image, said comparison module being configured for carrying out a comparison between the digital surface condition image and the normative surface condition image and for generating a digital difference image a valuation module including a database with vehicle price data and said evaluation module being configured for generating a vehicle valuation based on the vehicle price data, the digital difference image and the repair data.

\* \* \* \* \*